(12) United States Patent
Åström et al.

(10) Patent No.: US 6,198,641 B1
(45) Date of Patent: Mar. 6, 2001

(54) PLANT FOR TRANSMITTING ELECTRIC POWER INCLUDING BIDIRECTIONALLY CONTROLLED THYRISTORS (BCT)

(75) Inventors: Urban Åström, Saxdalen; Bruno Halvarsson, Ludvika; Lars Hermansson, Västerås, all of (SE)

(73) Assignee: ABB AB (SE)

( * ) Notice: Subject to any disclaimer, the term of this patent is extended or adjusted under 35 U.S.C. 154(b) by 0 days.

(21) Appl. No.: 09/445,473
(22) PCT Filed: Jun. 2, 1998
(86) PCT No.: PCT/SE98/01036
    § 371 Date: Dec. 8, 1999
    § 102(e) Date: Dec. 8, 1999
(87) PCT Pub. No.: WO98/57412
    PCT Pub. Date: Dec. 17, 1998

(30) Foreign Application Priority Data
Jun. 12, 1997 (SE) .................................. 9702251

(51) Int. Cl.[7] ...................................... H02J 3/36
(52) U.S. Cl. ............................................ 363/35
(58) Field of Search ............... 174/DIG. 17, DIG. 18, 174/DIG. 34; 363/35

(56) References Cited

U.S. PATENT DOCUMENTS

| 4,689,733 | * | 8/1987 | Guth et al. | 363/35 |
| 5,187,651 | * | 2/1993 | Ekstrom | 363/35 |
| 5,867,375 | * | 2/1999 | Svensson et al. | 363/35 |
| 6,067,238 | * | 5/2000 | Halvarsson et al. | 363/35 |

\* cited by examiner

Primary Examiner—Shawn Riley
Assistant Examiner—Gary L. Laxton
(74) Attorney, Agent, or Firm—Dykema Gossett, PLLC

(57) ABSTRACT

In a plant for transmitting electric power between two stations (17, 18) through a direct voltage network (16) for High Voltage Direct Current an arrangement (23) is arranged for draining electric power from the direct voltage network. The arrangement has a valve (24) made of bidirectionally controlled thyristors (BCT) with ability to conduct current in both directions therethrough. The plant has also a unit (25) adapted to control the thyristors of the valve so that the current direction between the direct voltage network and the valve is such that electric power is fed from the direct voltage network to an alternating voltage network- connected to the valve independently of the power feeding direction between said two stations (17, 18).

3 Claims, 1 Drawing Sheet

PLANT FOR TRANSMITTING ELECTRIC POWER INCLUDING BIDIRECTIONALLY CONTROLLED THYRISTORS (BCT)

FIELD OF THE INVENTION AND PRIOR ART

The present invention relates to a plant for transmitting electric power. A direct voltage network for High Voltage Direct Current (HVDC) and at least two stations connected thereto have line commutated valves with thyristors as rectifying semiconductor components for transmitting electric power between the direct voltage network and alternating voltage networks connected to the stations. The plant further comprises at least one arrangement along the direct voltage network for draining electric power from or feeding electric power into the direct voltage network independently of the polarity thereof and by that the power feeding direction between the different stations of the plant. The arrangement comprises at least one valve having thyristors as rectifying components connected between the direct voltage network and an alternating voltage network adapted to receive electric power drained from the direct voltage network.

In a plant for transmitting electric power through a direct voltage network for High Voltage Direct Current the direct voltage network may extend over very long distances, well in the order of hundreds of kilometres or more, between stations belonging thereto. Sometimes the need arises for feeding or draining electric power from the direct voltage network at certain locations therealong. For example, as a consequence of the discovery of a local gas well or the like. It is then important to ensure that when there is a need, electric power may be drained or fed through the arrangement independently of the power feeding direction on the direct voltage network between the stations, i.e. independently of the polarity of the direct voltage network.

FIG. 1 shows a known plant for a unipolar direct voltage network 1 for High Voltage Direct Current. Two stations 2, 3 are each connected to the direct voltage network and an alternating voltage network 7 through respective valves 4, 5 and a transformers 6. The plant also has an arrangement 8 having only one valve 9 for draining electric power from the direct voltage network. The direction of the current through valve 9, determines at a given polarity of the direct voltage network, i.e. at a given direction of the feeding of power between the stations 2 and 3, if electric power is really drained or tapped through the arrangement 8. Thus, the current direction of the arrangement 8 has to be the same as in the one of the stations 2 and 3 which, in a given instant, functions as inverter, i.e. to which power is fed from the direct voltage network. The arrangement 8 has a high voltage switch gear 10 with two breakers 11, 12 and a low voltage switch gear 13 with two breakers 14, 15. When the station 2 receives electric power at a negative high voltage polarity on 1, i.e. the valve 4 is in inverter operation, the breakers 11 and 15 are closed. Likewise, breakers 12 and 14 are closed when the station 3 receives electric power and the polarity on 1 is positive. This solution is complicated and costly as a consequence of the requirement for the two switch gears, as well as the increased demands on insulation distances.

SUMMARY OF THE INVENTION

The object of the present invention is to provide a plant having a simple construction with considerably lower costs than arrangements of the prior art discussed above.

The object is obtained by employing a valve having bidirectionally controlled thyristors (BCT) with ability to conduct current in both directions, and controlling the valve so that the current direction between the direct voltage network and the valve is such that power is fed either the direct voltage network to the alternating voltage network connected to the valve or in the opposite direction.

By arranging such bidirectionally controlled thyristors in the valve of the arrangement the current direction between the valve and the direct voltage network may be freely chosen without requiring more than one valve per pole of the direct voltage network. This means that the current direction may always be adjusted so that it corresponds to the current direction of the station receiving electric power and may thus drain (or feed) electric power from the direct voltage network independently of the polarity of the direct voltage network without any complicated switch gears or double valves. The bidirectionally controlled thyristors are of the type described in for example DE 44 39 012 A1 and are sometimes also called two-directions thyristors.

Thus, the preferred arrangement of a unipolar network requires only one valve per pole without any costly surrounding equipment of the direct voltage network Further advantages of the invention will appear from the following description.

BRIEF DESCRIPTION OF THE DRAWING

With reference to the appended drawing, a description of an exemplary embodiment of the invention follows. In the drawing.

DETAILED DESCRIPTION OF THE INVENTION

Figure 1:
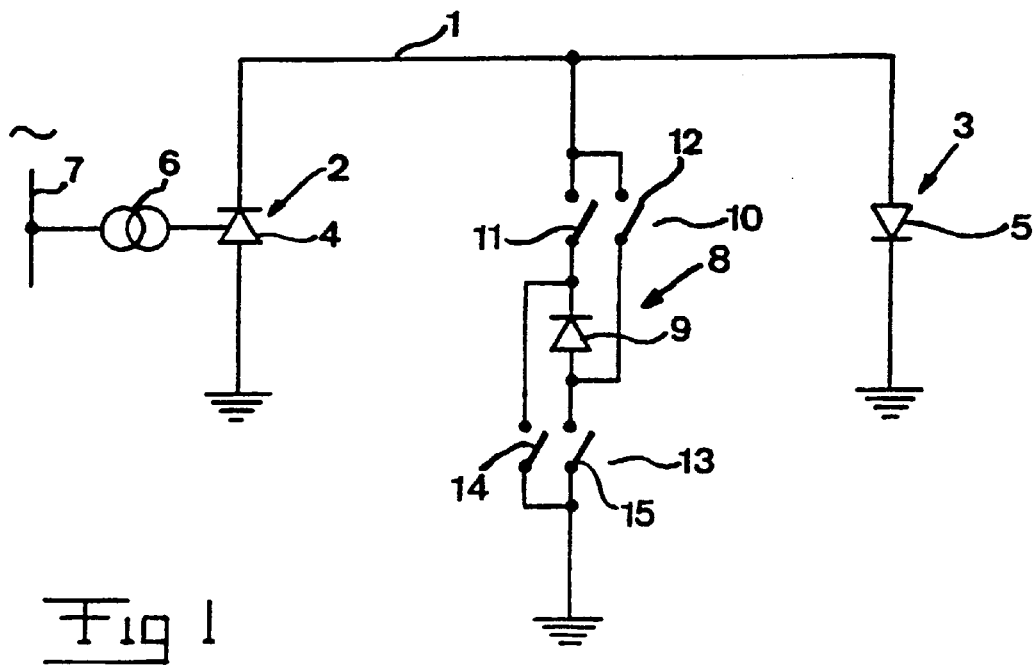
FIG. 1 is a simplified circuit diagram illustrating a known plant.
Figure 2:
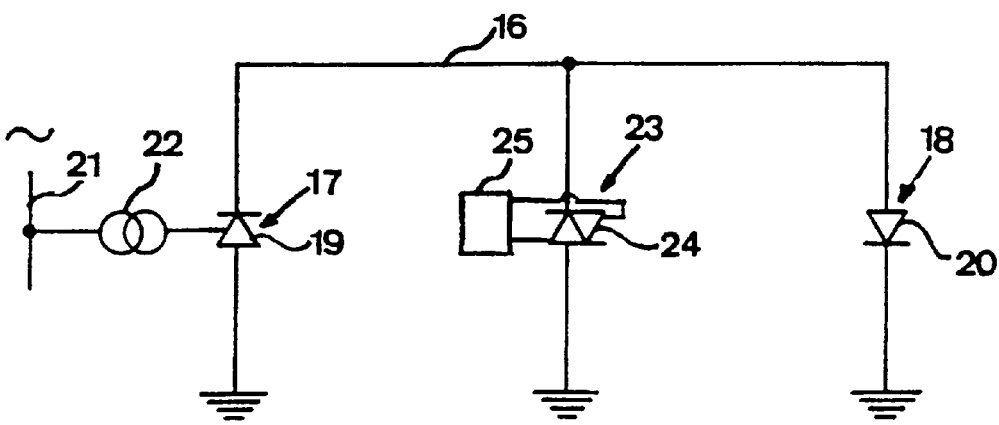
FIG. 2 is an illustration of a plant according to the invention.

FIG. 2 illustrates a plant according to the invention for transmitting electric power through a unipolar direct voltage network 16 between two stations 17 and 18. The stations each have a respective line commutated valve 19, 20 of the type employing thyristors as rectifying semiconducting components. Each valve 19 and 20 may be constructed for example as a well known 12-pulse bridge with thyristors connected in series in sufficient numbers to drop the voltage across the valve in question. This voltage may be in the order of 10–500 kV, while each thyristor can only drop 1–10 kV. A direct voltage network 21 is connected to the two stations 17 and 18 through a transformer 22 for feeding electric power between this alternating voltage network 21 and the direct voltage network 16.

The current direction will always be through the valve 19 to the direct voltage network 16 towards and through the valve 20. The power feeding direction between the two stations is selected through the choice of polarity of the direct voltage network 16, so that when the polarity is positive, i.e. when there is a higher positive potential at the valve 19 than at the valve 20, power will be fed from the station 17 to the station 18. When the polarity of the direct voltage network 16 is negative, i.e. more negative potential at the valve 20 than at the valve 19, the power will be fed in the opposite direction.

The plant has a circuit arrangement 23 for draining electric power from the direct voltage network 16 or for feeding electric power thereinto. The arrangement 23 is simple and has a single valve 24 constructed in the same way as the valves 19 and 20, but employs bidirectionally controlled thyristors BCT instead of conventional thyristors. Such thyristors have two halves of one and the same semiconductor disc with the conducting direction in opposite directions. The arrangement has also a control unit 25 adapted to control the thyristors of the valve 24, so that the current direction between the direct voltage network 16 and the valve is such that power is fed from the direct voltage network 1 to the alternating voltage network 21 independently of the polarity of the direct voltage network 16, i.e. so that the current direction through the valve 24 with respect to the direct voltage network is the same as the current direction through one of the valves 19 and 20 that is in inverter operation, i.e. through which power is fed from the direct voltage network to an alternating voltage network connected to the valve. Alternatively, the control unit 25 controls the thyristors so that power is always fed out to the direct voltage network independently of the polarity thereof.

The invention is of course not in any way restricted to the embodiment described above, but many possibilities to modifications thereof would be apparent to one of ordinary skill in the art without departing from the basic idea of the invention such as defined in the claims.

The direct voltage network could, as already noted, be bipolar, in which the draining arrangement may then have either one or two valves, depending upon the amount of power to be drained.

It is also possible to handle the amount of power by a single valve, which may be switchable between the two poles in the bipolar transmission so that a maximum of flexibility is obtained.

It is of course also possible that the plant is provided with several arrangements of the type described above.

What is claimed is:

1. A plant for transmitting electric power between a direct voltage network for High Voltage Direct Current (HVDC) and an alternating voltage network having at least two stations connected therebetween, each station having a line commutated valve including a thyristor rectifying semiconductor component for transmitting electric power between the direct voltage network and the alternating voltage network, said plant including a circuit arrangement located along the direct voltage network for draining electric power from or feeding electric power into the direct voltage network independently of the polarity of said direct voltage network according to the power feeding direction between the different stations of the plant, said circuit arrangement having at least one bidirectional valve including bidirectionally controlled thyristors (BCTs) for conducting current in both directions through said bidirectional valve, and a control unit for controlling the BCTs so that the current direction between the direct voltage network and the bidirectional valve is such that power is fed either from the direct voltage network to the alternating voltage network or in the opposite direction.

2. A plant according to claim 1, wherein the circuit arrangement has one valve per pole of the direct voltage network.

3. A plant according to claim 2, wherein the direct voltage network is unipolar.

* * * * *